United States Patent [19]
Roberts

[11] Patent Number: 5,880,837
[45] Date of Patent: Mar. 9, 1999

[54] EYE MEASUREMENT OF OPTICAL SIGNALS BY OPTICAL SAMPLING

[75] Inventor: Kim Byron Roberts, Welwyn Garden City, United Kingdom

[73] Assignee: Northern Telecom Limited, Quebec, Canada

[21] Appl. No.: 892,706

[22] Filed: Jul. 15, 1997

[30] Foreign Application Priority Data

Jun. 9, 1997 [GB] United Kingdom .................... 9712019

[51] Int. Cl.[6] ...................................................... G01B 9/02
[52] U.S. Cl. .......................................... 356/345; 356/351
[58] Field of Search ....................................... 356/351, 345

[56] References Cited

U.S. PATENT DOCUMENTS

| | | |
|---|---|---|
| 4,097,697 | 6/1978 | Harman . |
| 4,823,360 | 4/1989 | Tremblay . |
| 5,524,144 | 6/1996 | Suzuki . |

FOREIGN PATENT DOCUMENTS

| | | |
|---|---|---|
| 2253122 | 8/1992 | United Kingdom . |
| 2099663 | 12/1992 | United Kingdom . |

OTHER PUBLICATIONS

IEEE Photonics Technology Letters, vol. 8. No. 9, Sep. 1996 10 GB/s Wavelength Conversion with Integrated Multiquantum — Well–Based 3–Port Mach–Zehnder Interferometer. W. Idler et al.

22nd European Conference on Optical Communication (ECOC'96 Oslo) Eye–diagram Measurement of 100 Gbit/s Optical Signal using Optical Sampling. — H. Takara et al.

*Primary Examiner*—Frank G. Font
*Assistant Examiner*—Andrew Lee
*Attorney, Agent, or Firm*—John D. Crane

[57] ABSTRACT

A pulsed optical signal (13) of a network (23) is monitored to obtain eye measurement data as a means of obtaining an indication of signal degradation. Optical sampling of the optical signal is effected by means of an interferometer (2) in which sampling optical pulses (8) are propagated equally through arms 3 and 4 of the interferometer which include semiconductor optical amplifiers. The optical signal to be monitored is counter propagated through one arm of the interferometer, thereby setting an interference condition of the interferometer by cross modulation in one of the semiconductor optical amplifiers. The output is detected and converted to electrical signals which are processed to obtain the eye measurement data. Parameters defining the quality of the eye are extracted and processed to locate defects occurring within a network by deploying eye monitors at a number of locations. Elements of the network may be controlled using the output parameters.

37 Claims, 8 Drawing Sheets

SIGNAL EYE WITHOUT SPM

B

SIGNAL EYE WITH SPM

Fig 8

A  WITHOUT CPM

B  WITH CPM

C  WITH CPM AND SPM

D  WITH MORE CPM AND SPM

EYE MEASUREMENT OF OPTICAL SIGNALS BY OPTICAL SAMPLING

FIELD OF THE INVENTION

This invention relates to apparatus and methods for use in eye measurement of optical signals in optical communication systems.

BACKGROUND TO THE INVENTION

Optical communication systems typically handle optical pulses with bit rates in the range 2–10 Gbits/sec with future generations of systems being expected to a handle bit rates up to 40 Gbits/sec and beyond. At such higher bit rates, the onset of self phase modulation and cross phase modulation is known to occur at high power levels and it is important to be able to monitor transmissions to detect signal degradation associated with these effects. A problem associated with the tendency towards higher bit rates is that it becomes increasingly difficult to monitor signal degradation using methods which involve detection of the optical signal and subsequent electronic processing because of the inherent difficulties of performing such electronic processing at very high bit rates.

A telecommunications systems in which optical signals traverse an optical network will typically contain a combination of transmission waveguides, optical amplifiers, switches, cross-connects, filters and dispersion compensators. Monitoring of these elements of the system to detect failure or degradation would ideally require monitoring the optical signal at separate locations downstream of each of the elements such that deterioration or failure of any of the elements can be detected and localised to identify the specific elements responsible.

Presently, however, the provision of electronic detection and processing apparatus capable of eye measurement is prohibitively expensive for bit rates in excess of about 10 Gbits/sec and is therefore confined to wide band receivers which are typically downstream of a large number of such elements.

Examples of the use of performance monitors in such receivers to determine parameters related to the eye diagram are disclosed by Harman U.S. Pat. No. 4,097,697 and Tremblay et al U.S. Pat. No. 4,823,360. In each case, an optical signal is regenerated and signal quality monitored.

It is also known from H. Takara et al, "Eye—diagram measurement of 100 Gbits/sec optical signal using optical sampling": 22nd European Conference on Optical Communication—ECOC 1996 Oslo", to perform eye diagram measurement by optical sampling using an organic non-linear crystal. The ability to use optical sampling before conversion to electronic signal facilitates the use of less sophisticated electronic processing. Reliance upon the organic non-linear crystal however has inherent disadvantages such as a difficulty in integrating this optical component in a sensor system. A further major disadvantage of this method is that sampling pulses are required to be generated at high power, i.e. in excess of 200 watts, so that the method is useful only in the context of a laboratory oscilloscope.

It is known from Idler et al (IEEE Photonics Technology Letters, Vol. 8, No. 9, September 1996—"10 Gb/s Wavelength Conversion with Integrated Multiquantum-Well-Based 3-Port Mach-Zehnder Interferometer") to provide inversion of a single optical signal in addition to wavelength conversion by means of a Mach-Zehnder interferometer in which semiconductor optical amplifiers are utilised to set an interference condition between optical components of an input signal transmitted through first and second arms of the interferometer. A continuous wave optical signal propagated equally through the first and second arms is recombined to form an output signal which is modulated according to the interference condition and a pulsed optical signal is counterpropagated through only one of the arms so as to modulate the phase of one of the component signals by cross-phase modulation due to the non-linear characteristics of the semiconductor optical amplifier in that arm.

There remains a need for a more practical approach to eye measurement monitoring of optical signals in such systems.

SUMMARY OF THE INVENTION

It is an object of the present invention to provide a method and apparatus of monitoring optical signals by optical sampling.

It is a further objective of the present invention to provide method and apparatus for locating sources of signal degradation in an optical network and to provide means for controlling elements of the network to rectify such degradation.

According to the present invention, there is disclosed a method of monitoring a pulsed optical signal having a bit rate defining a bit period, the method comprising the steps of:

generating sampling optical pulses having a short duration relative to the bit period of the optical signal;

inputting the sampling optical pulses to an interferometer;

inputting the optical signal to the interferometer so as to vary an interference condition of the interferometer to an extent dependent on the optical signal;

outputting sampled optical pulses constituted by the sampling optical pulses modulated in accordance with the interference condition whereby the sampled optical pulses are representative of values of the optical signal at times determined by the inputting of the sampling optical pulses;

detecting the sampled optical pulses to obtain electrical data signals; and processing the electrical data signals to obtain an eye measurement data representative of an eye pattern the optical signal.

Preferably the interferometer is a Mach-Zehnder comprising first and second arms connected between an optical waveguide splitter and a waveguide combiner, the sampling optical pulses being transmitted through each of the first and second arms so as to be recombined in accordance with the interference condition. Preferably the first arm comprises a medium in which cross modulation occurs between the optical signal and the sampling optical pulses. Preferably the first arm comprises a semiconductor optical amplifier defining the medium.

The sampling optical signals may be generated at a sampling frequency which is offset from a subharmonic of a fundamental frequency value corresponding substantially to the bit rate, the frequency offset being selected such that data samples are obtained for a plurality of different phase values of the optical signal. The fundamental frequency value may be determined locally by performing a fast Fourier transform process on the data samples.

The interferometer may also be utilised in regenerating the optical signal by inputting a clock signal in the form of optical pulses which recombine at an output of the interferometer in accordance with an interference condition determined by the presence of the optical signal. The clock signal may be produced by a clock recovery system based on a further interferometer.

Eye measurement data obtained in the above method may be output as a display of an eye measurement pattern or in the form of parameters indicating the quality of the optical signal. A network may be provided with a number of separate monitoring locations from which eye measurement data may be obtained and compared by a comparator. Defects in the network may thereby be located and appropriate measures taken to rectify degradation of the optical signal, including, for example, the output of the measured parameters to control systems regulating elements of the network at the location identified to be a source of degradation.

A particular advantage of the method and apparatus of the present invention is that the interferometer with its associated waveguides and semiconductor optical amplifiers may form part of an integrated structure, such as a layered semiconductor structure based on an Indium Phosphide substrate, thereby simplifying manufacture and minimising the number of optical couplings required for assembly.

Preferred embodiments will now be described by way of example only and with reference to the accompanying drawings as follows.

DETAILED DESCRIPTION

Figure 1:
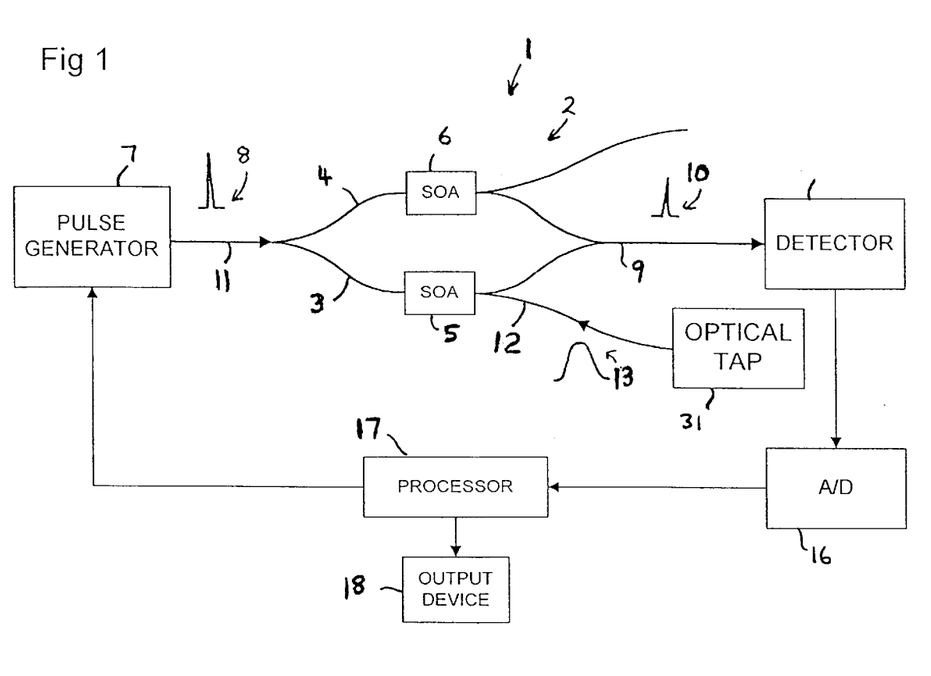
FIG. 1 is a schematic view of an optical sampler comprising an interferometer.

FIG. 1 illustrates an optical sampler 1 comprising a Mach-Zehnder interferometer 2 having first and second arms 3, 4 comprising respective first and second semiconductor optical amplifiers 5, 6. A pulse generator 7 generates sampling optical pulses 8 which are input via a first input waveguide 11 to each of the first and second arms 3, 4 and are recombined at an output waveguide 9 to form sampled optical pulses 10.

A second input waveguide 12 is connected to the first arm 3 so as to conduct the optical signal 13 via the first semiconductor optical amplifiers, without traversing the second arm 4, in a direction which is counter to the direction of propagation of the sampling optical pulses 8. The optical signal 13 is extracted from a network by means of an optical tap 31 and is processed by an automatic level control device (not shown) to regulate the signal level input to the second input waveguide 12.

The semiconductor optical amplifiers 5, 6 are respectively biased to control the phase of respective components of the sampling optical pulses such that, in the absence of any signal pulse of the optical signal 13, a destructive interference condition exists at the output waveguide 9 such that destructive interference occurs between the components of the sampling optical pulses 8 propagated via the first and second arms 3, 4 to thereby produce a null output in the output waveguide 9. In the presence of a pulse of the optical signal 13, cross phase modulation occurring in the active medium of the first semiconductor optical amplifier 5 results in a phase shift being induced in the component of the control optical pulse propagating through the first semiconductor optical amplifiers. The interference condition of the interferometer 2 is therefore varied, the output no longer being nulled and thereby producing sampled optical pulses 10 with an amplitude determined in accordance with the amplitude of the optical signal pulse 13. The sampling optical pulses 8 are generated to have a pulse length which is substantially shorter than the bit period of the optical signal so that the effective amplitude of the optical signal pulse 13 in determining the interference condition is determined by the timing of the sampling optical pulse since a sampled optical pulse is produced only when there is coincidence between a sampling optical pulse and an optical signal pulse.

A detector 14 performs optical to electrical conversion of the sampled optical pulses 10 and outputs electrical signals converted to data samples 15 via an analog to digital converter 16, the data samples then being input to a processor 17. The processor 17 provides output to an output device 18 which, for example, may be a display monitor for displaying an eye diagram or a communications link for communicating eye diagram data or eye measurement parameters to a remote location. The processor 17 also controls the pulse generator 7 and the biasing of the first and second semiconductor optical amplifiers 5, 6.

Figure 2:
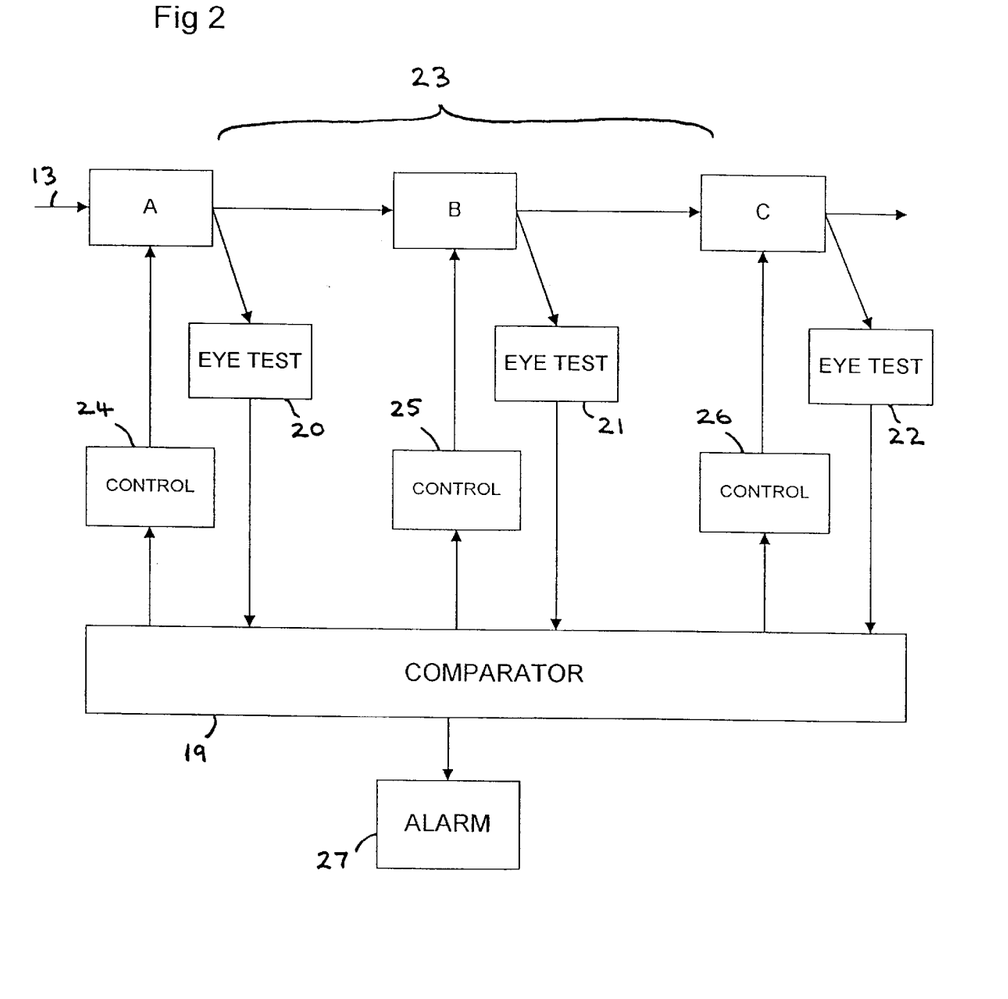
FIG. 2 is a schematic diagram of a communication system with a plurality of eye monitors.

As shown in FIG. 2, the output device 18 may be a comparator 19 receiving respective inputs from each of eye monitors 20, 21 and 22, each of which respectively corresponds to an arrangement as described above with reference to FIG. 1. The eye monitors 20, 21 and 22 are connected at different monitoring locations in an optical network 23 which are downstream of respective optical elements A, B and C.

The elements A, B and C have respective control systems 24, 25 and 26, each of which is responsive to an error signal from the comparator 19 indicating that degradation of the optical signal 13 has been identified and the source of degradation located as being the particular optical element controlled by the control system. The control system 24, 25 or 26 may then be able to effect remedial action by appropriate control of the optical element A, B or C to reduce or cancel the source of degradation or may provide a local indication that maintenance is required.

The comparator 19 determines the location of the source of deterioration by a comparison of parameters of the eye measurements obtained from each of the eye monitors 20, 21 and 22, the location of the source and degradation being assumed to lie upstream of the first occurring indication that the signal eye is degraded.

The comparator 19 may also signal an alarm as indicated schematically by alarm system 27 to alert system operators to the existence of malfunction or degradation.

In the above example, the optical network 23 transmits data with a bit rate of 10 Gbits/sec and the pulse generator 7 generates sampling optical pulses 8 with a pulse length of 10 picoseconds, thereby being significantly shorter than a 100 picosecond bit period of the optical signal. In order to simplify operation of the detector 14 and subsequent processing of data samples 15, the sampling optical pulses date are generated at a sampling frequency $f_s$ which is significantly less than the pulse frequency of the optical signal 13. The sampling frequency $f_s$ is selected to be offset slightly from a sub-harmonic of the actual frequency $f_0$ corresponding to the bit rate of the optical signal, the offset corresponding to a frequency increment $\Delta f$ which is sufficient to ensure that successive samples of the optical signal are taken at different phases to enable the data samples to represent the eye diagram over at least one full bit period.

In practice, the precise value of $f_0$ will not be known and the pulse generator 7 will therefore be required to operate on the basis of an estimated frequency $f_e$ corresponding to the best available estimated value of $f_0$. The origin of the estimated frequency may either be from measurement of the optical signal relative to a frequency standard of the pulse generator (generally a quartz oscillator) or from an external clock signal which for example may be made available by the network 23. An external clock will generally only be available in limited cases where the eye monitor is located close to a transmitter. In most cases therefore it is necessary to determine $f_e$ locally which may be effected for example by a fast Fourier transform process carried out on the data samples by the processor 17. An algorithm for determining the frequency increment $\Delta f$ will now be described and is illustrated in the flow chart of FIG. 3.

Figure 3:
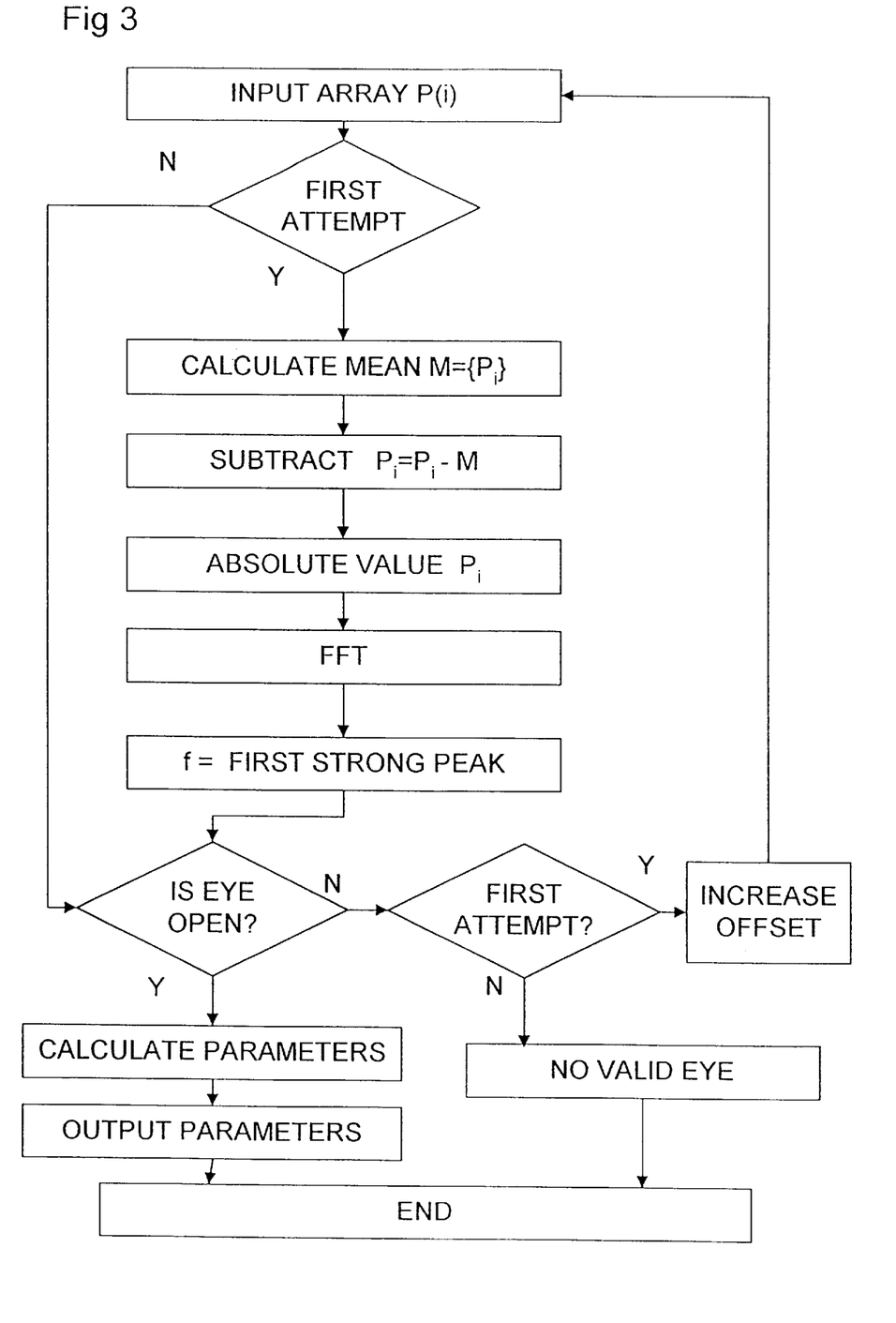
FIG. 3 is a flow chart illustrating an algorithm for determining eye measurement data including a fast Fourier transform process.

Samples of optical power $p_i$ are accumulated in an array, the array size being selected to be convenient for fast Fourier transform analysis and being taken as 1024 in the present examples. The mean value of the $p_i$ samples is calculated and the mean value subtracted from each sample in the array. The absolute value of the resulting samples is then calculated in order to introduce a non-linearity into the processing of the samples which can be detected by Fourier analysis as a clock tone corresponding to the estimated frequency $f_e$.

The Fourier transform is calculated using a standard fast Fourier transform algorithm and the first non zero frequency peak of the spectrum determined and taken as an initial value of $f_e$.

The eye measurement is then performed using sampling frequency $f_s$ calculated from $f_s=f_e+\Delta f$. Analysis of the resulting data will reveal whether an open eye measurement has been obtained. If an open eye measurement is not obtained, new samples are obtained and the processor recalculates the sampling frequency $f_s$ using an increased frequency increment $\Delta f'$. Failure to reveal an open eye may then lead to the conclusion that there is not a valid optical signal present.

Figure 4:
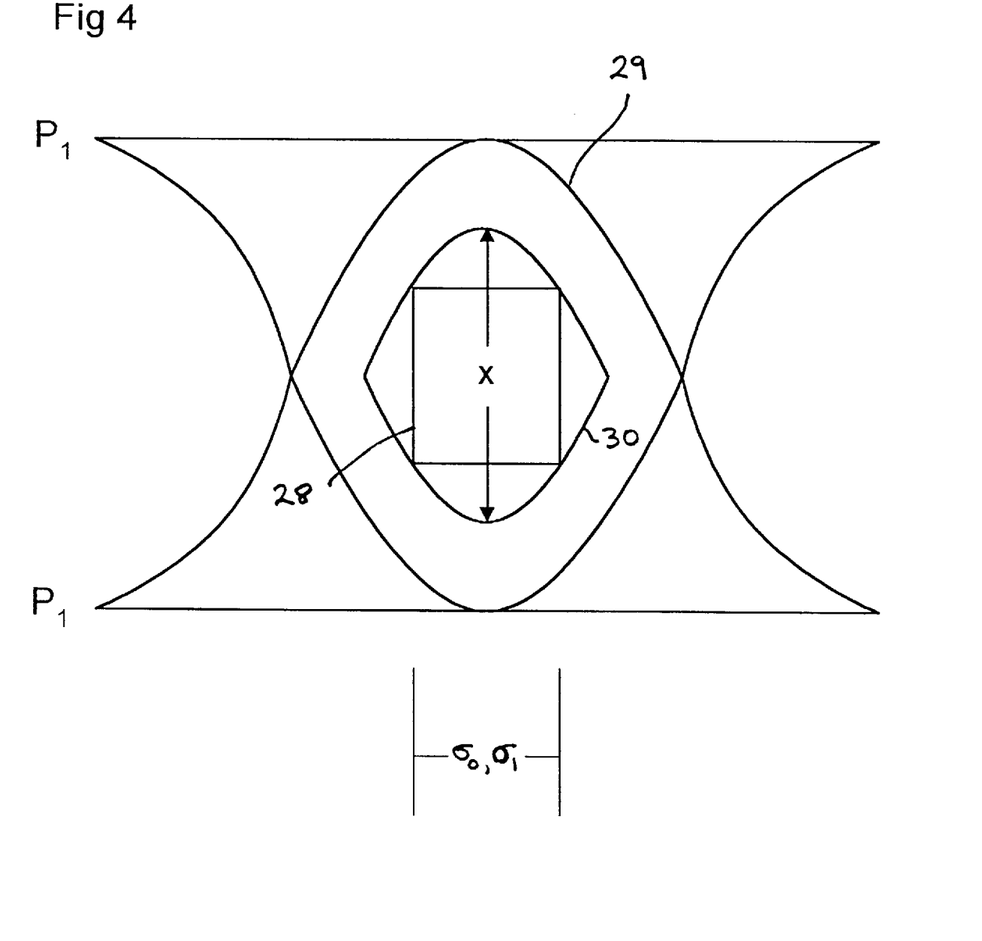
FIG. 4 is a schematic eye diagram.

The eye diagram may be analysed using standard algorithms to produce parameters such as a distortion factor defining the extent to which sample data encroaches into a phase window 28 as shown in FIG. 4 in which an eye diagram is schematically indicated in terms of a perfect theoretical curve 29 and an inner eye boundary curve 30 representing degradation in a real system. The eye diagram of FIG. 4 is essentially a plot of optical signal path against time with the curves indicating the locus of accumulated data points. $p_1$ and $p_0$ represent the power levels corresponding to continuous logic state 1 and logic state 0 respectively.

The height of the eye opening X in FIG. 4 may also be utilised in calculating a quality factor Q defined by the equation:

$$Q = \frac{x}{\sigma_1 + \sigma_0}$$

where:
$\sigma_1$ is the measured standard deviation in data corresponding to $p_0$ for phase values corresponding to the phase window 28; and
$\sigma_0$ is the measured standard deviation of data corresponding to $p_0$ for phase values corresponding to the phase window 28.
$\sigma_1$ and $\sigma_0$ therefore represent a noise power at the eye opening of the logic 1 and logic 0 signal states. The value of Q can be directly related to the bit error rate, assuming Gaussian distribution, an error rate of $10^{-9}$ corresponding for example to a value Q=6.

Such parameters may be output from the processor and used as inputs to control systems 24, 25, 26 for evaluating the parameters and regulating optical elements A, B, C of the optical network 23 and additionally or alternatively to alarm systems 27 operable to evaluate the parameters and generate an alarm signal if the parameters do not meet predetermined criteria. In particular, the control systems and alarm systems 27 may be arranged to be responsive to the effects of self phase modulation and cross phase modulation.

Figure 7:
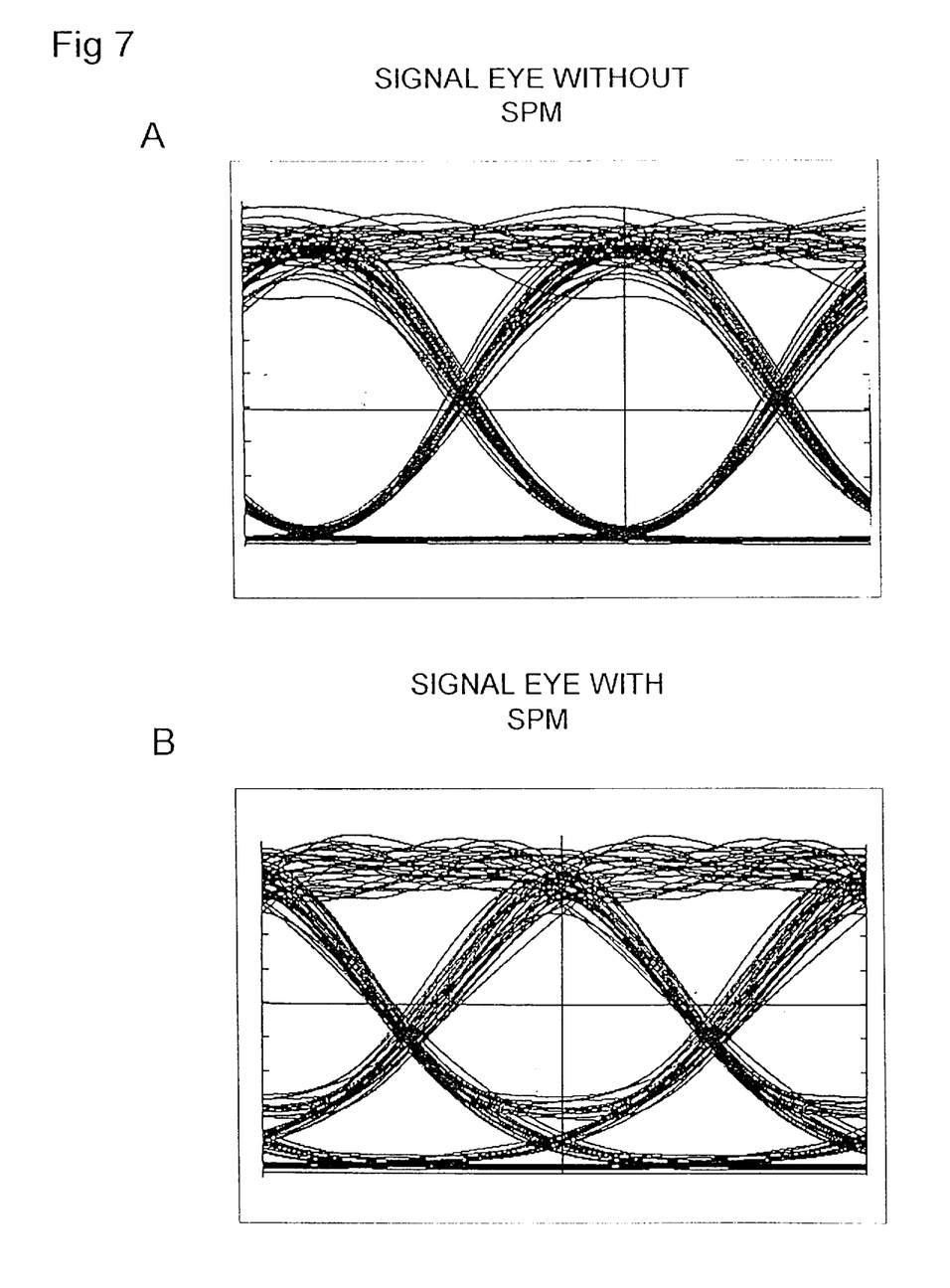
FIG. 7 illustrates simulated eye diagrams for optical signals without SPM and with SPM.

FIG. 7 illustrates the distinctive characteristics of SPM (self phase modulation), simulated eye diagrams A and B corresponding to an optical signal without SPM and with SPM respectively. SPM can be identified in an eye diagram by the effect of the top of the eye opening becoming pointed or sharpened and also by the lower "eye lid" becoming raised and broadened.

Figure 8:
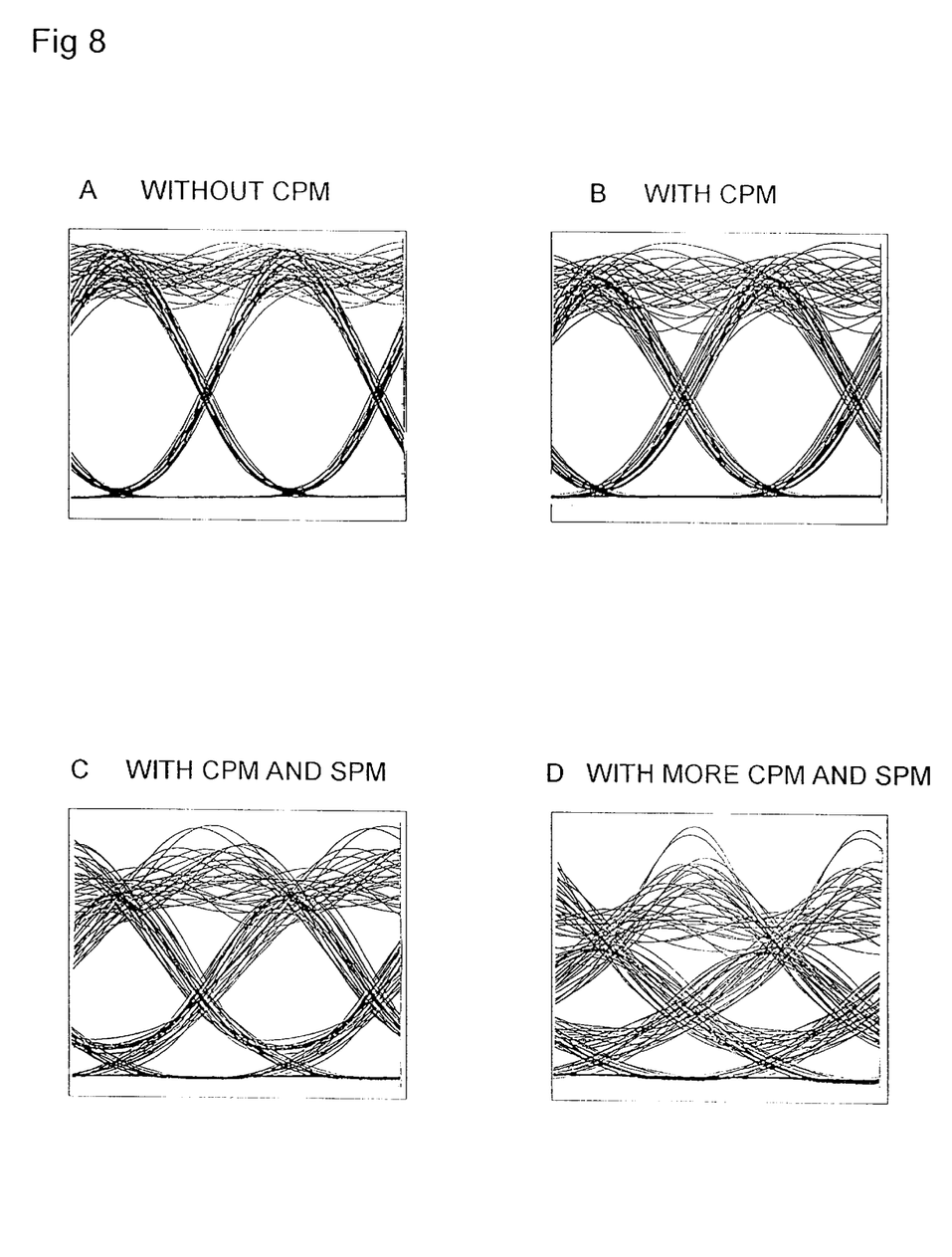
FIG. 8 illustrates simulated eye diagrams and showing the progressive onset of CPM and SPM.

FIG. 8 illustrates the characteristic appearance of CPM (cross phase modulation), eye diagrams A and B corresponding to an optical signal without CPM and with CPM respectively. The characteristic features of CPM are the excursions and oscillations appearing at the top of the eye. Eye diagrams C and D in FIG. 8 illustrate the progressive effects of adding more CPM and SPM.

The processor 17 is programmed to detect the above described characteristics of CPM and SPM by an evaluation of the eye measurement data and to initiate appropriate alarm signals and/or control signals accordingly.

The interferometer 2 of FIG. 1 may be periodically calibrated since continuous operation is not essential. A typical calibration routine would be as follows.

The first semiconductor optical amplifier 5 would be turned off and the constant output level of sampling optical pulses (in the absence of optical signal 13) measured by the detector 14. The first optical amplifier 5 would then be turned on and the second semiconductor optical amplifier 6 turned off to repeat the above process and the gain of the first semiconductor optical amplifier adjusted until the detected output matched that recorded in respect of the second semiconductor optical amplifier. By ensuring equal power outputs in this manner, the conditions for interference may be optimized.

The processor 17 is programmed to carry out the above calibration routine.

Figure 5:
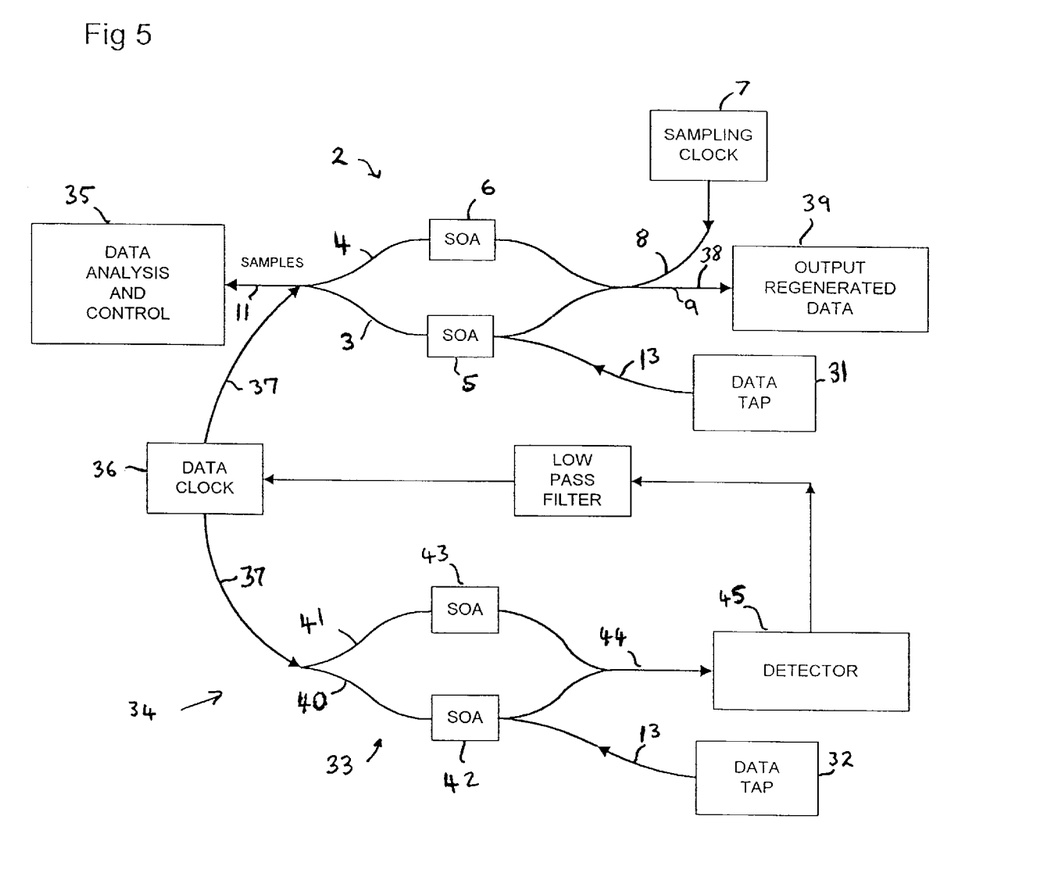
FIG. 5 is a schematic diagram of apparatus for both producing eye measurement data and regenerating an optical signal.

FIG. 5 illustrates the manner in which eye measurement may be combined with optical regeneration of the optical signal 13. Data tap connections 31 and 32 provide optical signals 13 which are input to a first interferometer operating as an optical sampler generally in the same manner described above with reference to FIG. 1 and also to a second interferometer 33 forming an optical clock recovery system 34.

The first interferometer 2 will be described using corresponding reference numerals to those of preceding figures where appropriate for corresponding elements and consists of first and second arms 3 and 4 comprising first and second semiconductor optical amplifiers 5 and 6. Sampling pulses 8 are generated by a pulse generator in the form of a sampling clock 7 at a sampling frequency $f_s$ which is offset from a subharmonic of the estimated frequency $f_e$ corresponding to the bit rate of the optical signal 13. The sampling optical pulses 8 are input to the interferometer 2 so as to propagate via both first and second arms 3 and 4 and to be recombined at waveguide 11 where sampled pulses are output according to an interference condition existing in the first interferometer 2. The optical signals 13 are input to the first interferometer 2 so as to propagate via only the first arm 3 and via only the first semiconductor optical amplifier 5 so that, at the instant determined by the timing of any of the sampling pulses 8, the interference condition determining the sampled pulses is set by the instantaneous amplitude of the optical signal 13. The sampled optical pulses are analysed and used for control purposes in the manner described above with reference to FIG. 1 and represented in FIG. 5 by data analysis and control unit 35.

A data clock pulse generator 36 outputs data clock pulses 37 in the form of pulses which have a short duration relative to the bit period of the optical signal 13 and which are timed to co-incide with the fully opened eye of FIG. 4. The data clock pulses 37 are propagating through the first interferometer 2 entering via the first waveguide 11, being equally coupled into the first and second arms 4, and resulting in regenerated output data pulses 38 being output from the first interferometer 2 via the output waveguide 9. The data clock pulses 37 are counter propagated in the first interferometer relative to the sampling pulses 8 and do not significantly affect the interference condition of the first interferometer since the sampling energy in each of the optical pulses 8 is small.

Optical signals 13 from the data tap connection 31 propagated in the first arm 3 via the first semiconductor optical amplifier 5 determine the interference condition in the first interferometer 2 for recombination of the divided components of the data clock pulses. In the presence of a signal pulse of the optical signal 13, the regenerated output pulse 38 has an amplitude dependent on the instantaneous amplitude of the signal pulse and a timing determined by the timing of the data clock pulse 37. In this way, the optical signal 13 is converted to a regenerated output pulse stream 38, represented in FIG. 5 by the output of regenerated data 39. The regenerated data may then be subject to pulse shaping processing before further transmission.

The second interferometer 33 functions as a phase comparator, the output of which is detected and low pass filtered to provide a feedback signal regulating the data clock 36. The second interferometer 33 is similar in construction to the first interferometer 2 and comprises first and second arms 40 and 41 comprising first semiconductor optical amplifiers 42 and 43 respectively. Data clock pulses 37 are input to the second interferometer 33 so as to be coupled equally into the first and second arms 40 and 41 and recombined in an output waveguide 44 according to an interference condition determined by the semiconductor optical amplifiers 42, 43. Optical signals 13 from the data tap connection 32 are counter propagated through the first arm 40 so as to counter propagate in the first semiconductor optical amplifier 42. The semiconductor optical amplifiers 42, 43 are biased such that the interference condition provides maximum constructive interference at the output waveguide 44 when the instantaneous amplitude of the optical signal 13 when sampled by the data clock pulses 37 is 50% of the peak level of the optical signal.

Figure 6:
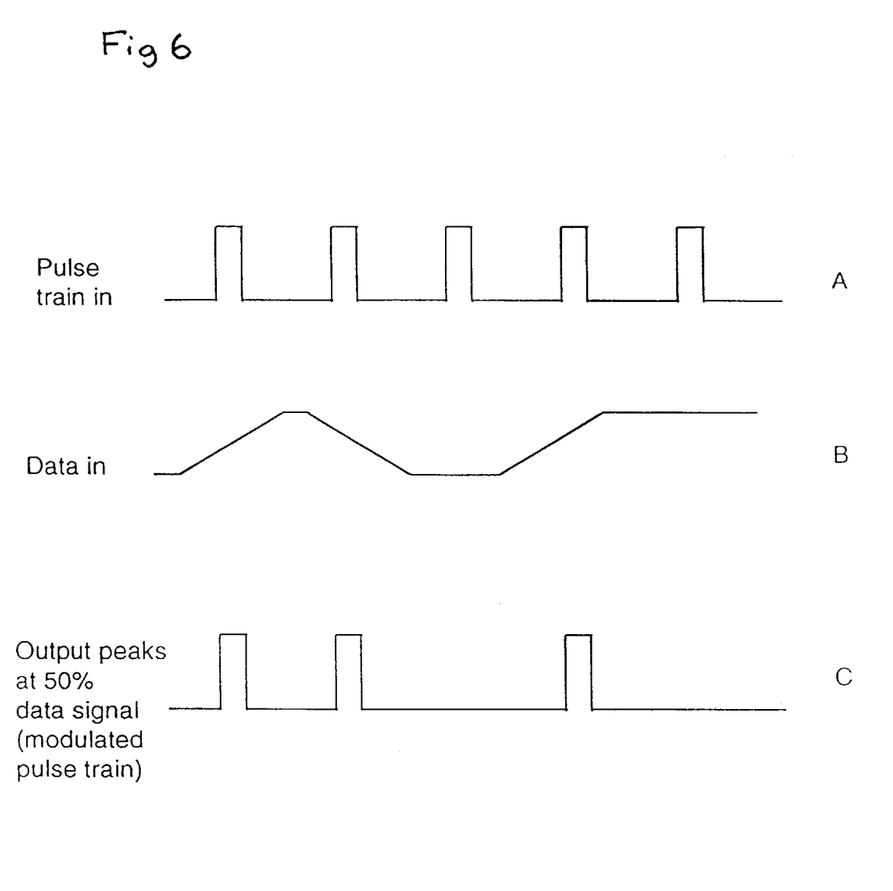
FIG. 6 is a schematic representation of waveforms of optical signals in the apparatus of FIG. 5.

FIG. 6 shows schematically the waveforms in the second interferometer 33 where waveform A corresponds to the data clock pulses 37, waveform B corresponds to the optical signal 13 and wave form C corresponds to the output signal in the output waveguide 44.

A detector 45 connected to the waveguide 44 receives peak output when the optical signal waveform is sampled halfway between its high and low states. Consequently, if the phase of the data clock 36 drifts so as to take the clock pulses 37 out of synchronisation with the optical signal 13, the output peaks shown in waveform C would become reduced in amplitude. The detector output is filtered and fed back to the data clock 36 which includes a controller to compensate for any phase drift.

In the arrangement of FIG. 5, the sampling clock 7 operates at a sampling frequency $f_s$ calculated from $f_e$ where $f_e$ is taken from the data clock.

It is advantageous for the wavelength of the sampling clock pulses to be the same as that of the data clock pulses 37. This may be achieved by deriving the pulses from the same laser and taking a continuous wave output from the laser which is divided before being separately modulated to provide the sampling optical pulses and the data clock pulses. The use of a common wavelength is advantageous because it allows the condition for interference in the first interferometer to be optimised for both regeneration and sampling for the eye monitor process.

In the example of FIG. 5, the sampling optical pulses 8 and the data clock pulses 37 are propagated in opposite directions and therefore separation at the output waveguide 9 is unnecessary. It may be advantageous in some cases for propagation to occur in the same direction, in which case different wavelengths may be utilised and the output pulses separated using a wave length division multi-plexing separation filter in the output wave guide 9. For such an arrangement, the wave length of the sampling clock 7 may be actively tuned so as to create a matching condition of interference at the zero data level of the optical signal 13. Alternatively, co-propagating data clock pulses and sampling optical pulses may be separated by the use of orthogonal polarisation states and a polarisation analyser in the output wave guide 9.

By including eye monitoring in the regenerator as shown for example in FIG. 5, the cost of implementing regeneration and monitoring is reduced and the ability to monitor for defects during regeneration is enhanced.

The present invention has particular application in monitoring and correcting degradation of optical signals due to cross phase modulation and self phase modulation, such non-linearalities being associated with high frequency signals and difficult to measure using conventional techniques. The above described interferometer circuits, including semiconductor optical amplifiers and waveguides, are suitable for fabrication by being grown together in integrated optoelectronic circuits, thereby enabling low cost packaging with the minimum number of optical connections.

The present invention also has application to existing telecommunication networks using the SONET signal hierarchy for which the lowest pulse rate corresponds to a frequency of 51.84 MHz. By taking a subharmonic at $\frac{1}{32}$ second of this frequency, a sampling pulse rate is obtained of approximately 2 MHz. Since the higher frequency SONET bit rates are multiples of 51.84 MHz, the pulse generator may operate using a common sampling pulse rate.

I claim:

1. A method of monitoring a pulsed optical signal having a bit rate defining a bit period, the method comprising the steps of:
    generating sampling optical pulses having a short duration relative to the bit period of the optical signal;
    inputting the sampling optical pulses to an interferometer;
    inputting the optical signal to the interferometer so as to vary an interference condition of the interferometer to an extent dependent on the optical signal;
    outputting sampled optical pulses constituted by the sampling optical pulses modulated in accordance with the interference condition whereby the sampled optical pulses are representative of values of the optical signal at times determined by the inputting of the sampling optical pulses;
    detecting the sampled optical pulses to obtain electrical data signals; and
    processing the electrical data signals to obtain eye measurement data representative of an eye pattern of the optical signal.

2. A method as claimed in claim 1 wherein the interferometer comprises first and second arms;
    including the steps of transmitting the sampling optical pulses through each of the first and second arms to be recombined as the sampled optical pulses and propagating the optical signal through the first arm to vary the interference condition by cross modulation between the optical signal and the sampling optical pulses occurring in a medium constituting the first arm.

3. A method as claimed in claim 2 wherein at least the first arm comprises a semiconductor optical amplifier defining said medium.

4. A method as claimed in claim 1 including the step of transforming the data signals according to a predetermined transfer function to obtain values of the data signals substantially proportional to the optical signal as sampled.

5. A method as claimed in claim 1 wherein the sampling optical signals are generated at a sampling frequency which is offset from a sub-harmonic of a fundamental frequency value corresponding substantially to the bit rate, the sampling frequency being offset by a frequency increment selected such that data samples are obtained for a plurality of different phase values of the optical signal.

6. A method as claimed in claim 5 including the step of determining the fundamental frequency value by performing a fast Fourier transform process on the data samples.

7. A method as claimed in claim 1 including the step of generating a clock signal by a clock recovery process performed on the optical signal and generating the sampling optical pulses such that the timing of the sampling optical pulses is determined relative to the clock signal.

8. A method as claimed in claim 7 including the step of regenerating the optical signal utilising the clock signal.

9. A method as claimed in claim 8 including the steps of:
    inputting the clock signal to the interferometer in the form of optical clock pulses having a short duration relative to the bit period of the optical signal;
    inputting the optical signal to the interferometer so as to vary an interference condition of the interferometer to an extent dependent on the optical signal; and
    outputting regenerated signal pulses constituted by the optical clock pulses modulated in accordance with the interference condition.

10. A method as claimed in claim 7 wherein the clock signal is recovered by operation of a second interferometer.

11. A method as claimed in claim 1 including the step of displaying an eye pattern representative of the eye measurement data.

12. A method as claimed in claim 1 including the step of extracting performance parameters representative of the quality of the optical signal from the eye measurement data.

13. A method as claimed in claim 12 including the step of outputting said parameters to a control means and controlling an element of an optical network by operation of said control means in dependence upon values of said parameters.

14. A method as claimed in claim 12 including the step of evaluating said performance parameters to detect an error condition and outputting an error signal indicative of degradation of the optical signal.

15. A method as claimed in claim 1 including the steps of monitoring the optical signal at a plurality of locations in an optical network through which the optical signal is propagated;
    comparing the eye measurement data obtained by monitoring at the respective locations;
    and locating a source of degradation in the optical signal from said comparison.

16. A method as claimed in claim 15 including the step of identifying an element of the network as being a source of degradation of the optical signal and controlling the operation of the element to reduce the degradation.

17. Apparatus for monitoring a pulsed optical signal having a bit rate defining a bit period, the apparatus comprising:
    a pulse generator operable to generate sampling optical pulses having a short duration relative to the bit period of the optical signal;
    an interferometer having an input receiving the sampling optical pulses and a further input receiving the optical signal so as to vary an interference condition of the interferometer to an extent dependent on the optical signal;
    said interferometer having an output operable to output sampled optical pulses constituted by the sampling optical pulses modulated in accordance with the interference condition whereby the sampled optical pulses are representative of values of the optical signal at times determined by the inputting of the sampling pulses;
    a detector operable to obtain electrical data signals representative of the sampled optical pulses; and
    a processor operable to obtain eye measurement data from the electrical data signals, the eye measurement data being representative of an eye pattern of the optical signal.

18. Apparatus as claimed in claim 17 wherein the interferometer comprises first and second arms;
    means for coupling the sampling optical pulses into each of the first and second arms and recombining the sampled optical pulses after transmission through the first and second arms as the sampled optical pulses; and
    wherein the first arm comprises a medium providing cross modulation between the optical signal and the sampling optical pulses whereby the interference condition is varied by propagation of the optical signal through the first arm.

19. Apparatus as claimed in claim 17 wherein the first arm comprises a semiconductor optical amplifier defining said medium.

20. Apparatus as claimed in claim 17 wherein the processor is operable to transform the data signals according to a predetermined transfer function to obtain values of the data signals substantially proportional to the optical signal as sampled.

21. Apparatus as claimed in claim 17 wherein the pulse generator is operable to generate the sampling optical signals at a sampling frequency which is offset from a subharmonic of a fundamental frequency value corresponding substantially to the bit rate, the sampling frequency being offset by a frequency increment selected such that data samples are obtained for a plurality of different phase values of the optical signal.

22. Apparatus as claimed in claim 21 wherein the processor is operable to determine the fundamental frequency value by performing a fast Fourier transform process on the data samples.

23. Apparatus as claimed in claim 17 comprising a clock recovery system operable to generate a clock signal derived from the optical signal and wherein the pulse generator is operable to generate the sampling optical pulses such that the timing of the sampling optical pulses is determined relative to the clock signal.

24. Apparatus as claimed in claim 17 including regenerating means operable to regenerate the optical signal utilising the clock signal.

25. Apparatus as claimed in claim 24 wherein the interferometer comprises means for inputting the clock signal in the form of optical clock pulses having a short duration relative to the bit period of the optical signal;

means for inputting the optical signal to the interferometer so as to vary an interference condition of the interferometer to an extent dependent on the optical signal; and wherein said regenerating means is constituted by said interferometer being operable to output regenerated signal pulses constituted by the optical clock pulses modulated in accordance with the interference condition.

26. Apparatus as claimed in claim 23 wherein said clock recovery system comprises a second interferometer.

27. Apparatus as claimed in claim 17 comprising display means operable to display an eye pattern representative of the eye measurement data.

28. Apparatus as claimed in claim 17 wherein the processor is operable to extract performance parameters representative of the quality of the optical signal from the eye measurement data.

29. Apparatus as claimed in claim 28 wherein the processor is operable to output said parameters to a control means, said control means being operable to control an element of an optical network in dependence upon values of said parameters.

30. Apparatus as claimed in claim 28 wherein said processor is operable to evaluate said performance parameters to detect an error condition and further comprises means for outputting an error signal indicative of degradation of the optical signal.

31. Apparatus as claimed in claim 17 comprising an optical network through which the optical signal is propagated, a plurality of said monitoring apparatus being located at respective locations in said network and operable to obtain respective eye measurement data at said locations;

further comprising a comparator operable to compare the eye measurement data obtained by monitoring at the respective locations and to locate a source of degradation in the optical signal from said comparison.

32. Apparatus as claimed in claim 31 wherein said comparator is operable to identify an element of the network as being a source of degradation of the optical signal; and further comprising control means operable to control the operation of the element to reduce said degradation.

33. A method of monitoring the quality of a pulsed optical signal transmitted in an optical telecommunications system, the optical signal having a bit rate defining a bit period;

the method comprising the steps of;

generating sampling optical pulses having a short duration relative to the bit period of the optical signal;

inputting the sampling optical pulses to an interferometer;

inputting the optical signal to the interferometer so as to vary an interference condition of the interferometer to an extent dependent on the optical signal;

outputting sampled optical pulses constituted by the sampling by the sampling optical pulses modulated in accordance with the interference condition whereby the sampled optical pulses are representative of values of the optical signal at times determined by the inputting of the sampling optical pulses;

detecting the sampled optical pulses to obtain electrical data signals; and processing the electrical data signals to obtain eye measurement data representative of an eye pattern of the optical signal.

34. A method as claimed in claim 33 wherein said method of monitoring is performed at a plurality of monitoring locations of the system and through which the optical signal is transmitted;

including the further step of comparing eye measurement data obtained by monitoring at the respective monitoring locations; and locating a source of degradation in the optical signal from said comparison.

35. A method as claimed in claim 33 including the step of extracting performance parameters representative of the quality of the optical signal from the eye measurement data;

outputting said parameters to a control means and controlling an element of the optical system by operation of said control means in dependence upon values of said parameters.

36. A method as claimed in claim 33 including the step of extracting performance parameters representative of the quality of the optical signal from the eye measurement data; evaluating the parameters according to predetermined criteria, and generating an alarm signal representative of the quality of the optical signal being degraded if the parameters do not meet the predetermined criteria.

37. A method as claimed in claim 33 including the step of evaluating the eye measurement data to detect the presence in the optical signal of at least one of self phase modulation and cross phase modulation.

* * * * *